Nov. 22, 1932.  W. R. EDSON  1,888,454
LOOSE PLAY INDICATOR
Filed April 9, 1927   2 Sheets-Sheet 2

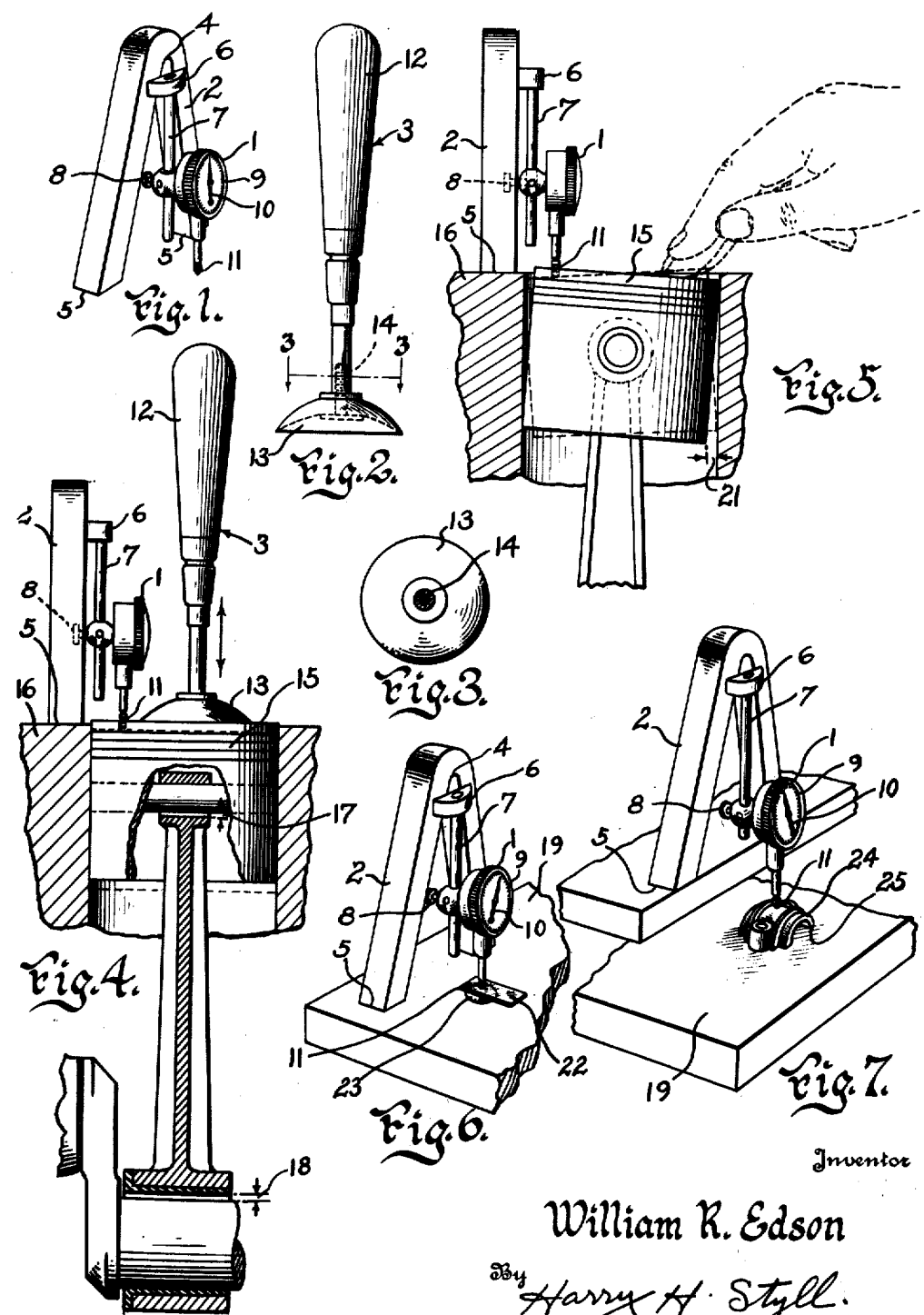

Inventor
William R. Edson.
By Harry H. Styll
Attorney

Patented Nov. 22, 1932

1,888,454

UNITED STATES PATENT OFFICE

WILLIAM R. EDSON, OF SOUTHBRIDGE, MASSACHUSETTS, ASSIGNOR TO B. C. AMES CO., OF WALTHAM, MASSACHUSETTS, A CORPORATION OF MASSACHUSETTS

LOOSE PLAY INDICATOR

Application filed April 9, 1927. Serial No. 182,359.

This invention relates to an improved apparatus and process for detecting looseness, wear or play in the bearings of combustion motors and the like and has particular reference to magnetic and suction means for facilitating the detection of this looseness or play.

The principal object of the invention is to provide improved means and processes for detecting looseness, wear or play in the pistons, wrist pins, connecting rods, crank shaft bearings and similar bearings of a combustion motor or similar device as used in automobiles, yachts, aeroplanes, etc.

Another object of the invention is to provide suction means for operating the piston to determine the said looseness or play.

Another object of the invention is to provide magnetic means for supporting the gaging mechanism of a device of this character.

Another object of the invention is to provide surface plate or supporting means that are attractive to a magnet to facilitate the measurements of the parts in which such looseness or play is involved.

Another object of the invention is to provide magnetic gage supporting means for the measurement of such looseness or play.

Another object of the invention is to provide an improved process or method of determining the various loosenesses or play in mechanism of this character.

Another object of the invention is to provide indicating means to measure the amount of said looseness or play.

Another object of the invention is to provide loose play detecting and measuring means which will be adjustable for use on various forms and sizes of motors, etc.

Another object of the invention is to provide improved means for detecting the up and down play or looseness in the connecting rod and wrist pins of combustion motors.

Another object of the invention is to provide means for detecting side or lateral looseness, wear or play of pistons in combustion motors and the like.

Another object of the invention is to provide improved means for applying the detecting and measuring means to various types of motors and similar devices.

Other objects and advantages of the invention will become apparent from the following description taken in connection with the accompanying drawings and it will be understood that many changes can be made in the details of construction, arrangements of parts and steps of the process without departing from the spirit of the invention as set forth in the accompanying claims. I, therefore, do not wish to be restricted to the exact details and arrangements shown, the preferred forms and steps of the process only having been shown and described by way of illustration.

Referring to the accompanying drawings:

Fig. 1 is a perspective view showing the measuring gage and bracket attachment for same;

Fig. 2 is an elevation of the suction handle for moving the piston;

Fig. 3 is a section on line 3—3 of Fig. 2;

Fig. 4 is an elevation partially in section through the cylinder of a combustion engine showing the measuring gage and suction handle in position;

Fig. 5 is an elevation partly in section showing the application of the measuring gage in measuring the side slap of a piston;

Fig. 6 is a perspective partially in section showing a method of measuring a shim plate of a crank shaft bearing;

Fig. 7 is a perspective showing a method of measuring the bearing cap for the crank shaft bearing;

Figure 8:
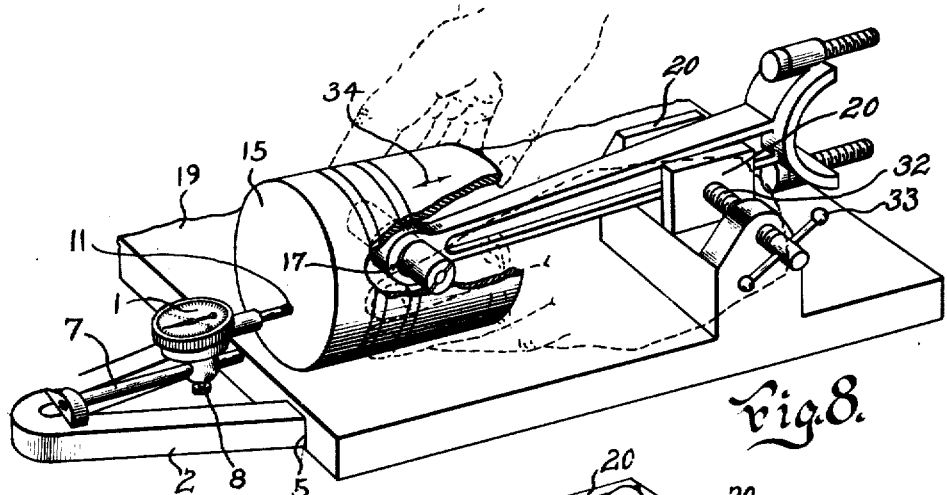
Fig. 8 is a perspective view showing a method of measuring for looseness or play in the wrist pin of a piston of a motor.

Referring to the drawings wherein similar characters of reference are used to denote corresponding parts throughout it will be seen that the apparatus for carrying out the measurements herein provided for consists of a measuring gage 1, a magnetic bracket 2 for carrying the same, and a suction handle member 3 for gripping the piston so that it may be moved to indicate its looseness or play. The magnetic bracket 2 consists of a bent bar magnet having the bend 4 and the two feet portions 5. A projection 6 on the bar magnet carries a rod 7 to which is secured the gage 1. The gage 1 may be moved up and down on the rod 7 by loosening the set screw 8 and may be secured in any desired position on the rod 7 by locking the set screw 8. The gage 1 has a dial 9 and an indicator hand 10 as well as a plunger 11 which operates the hand 10.

The suction handle 3 comprises the handle portion 12 and a rubber suction cup 13 secured to the handle by the screw 14.

Referring to Fig. 4, it will be noted that the suction handle 3 is in place on the piston 15 while the magnetic bracket 2 is in place on the cylinder head 16 being held there by magnetic attraction of the feet portions 5. The plunger 11 of the gage 1 is in contact with the outer end of the piston 15. There are two places in the piston connection where vertical play or looseness may take place; one is at the wrist pin at 17 and the other is at the crank shaft bearing at 18. Now it will be seen that if the suction cup or handle 3 is pulled up and down the amount of vertical play at 17 and at 18 will be indicated by the hand 10 on the dial 9 of the gage 1. However, the reading on the dial 9 will be a composite of the play at 17 plus the play at 18, so it will be necessary to measure one or the other of these plays individually to determine the amount of play at 17 as well as the amount of play at 18, one being a wrist pin play 17 and the other being a crank shaft looseness or play at 18. The wrist pin play is measured as shown in Fig. 8. The piston and its connecting rod are taken out of the engine and placed on an iron or steel surface plate 19 being clamped thereon by the vise 20. The magnetic bracket 2 is attached to the edge of the surface plate 19 by magnetic attraction of the feet 5. This throws the contact 11 of the gage 1 in engagement with the end of the piston 15. Now, if the piston is moved back and forth on the surface plates 19, as indicated by the arrows 34 the amount of play in the wrist pin bearing at 17 will be indicated on the dial 9 of the gage 1. If this amount is subtracted from the total amount of movement previously obtained for both the wrist pin and the bearing the remaining amount will indicate the amount of looseness at the crank shaft bearing, so in this way the wrist pin looseness as well as the crank shaft bearing play is obtained. In placing the contact 11 of the gage 1 for the operations of Fig. 4 just described, care should be taken that the contact point 11 is vertically directly above the wrist pin.

The amount of side slap or looseness of the piston is obtained as indicated in Fig. 5. The magnetic bracket 2 is placed again on the cylinder head 16 with the contact 11 of the gage 1 placed off to one side and not vertically over the wrist pin. Then the piston 15 is rocked either by hand or by the suction handle 3 as indicated in the dotted lines. This rocking from side to side will cause the plunger of the gage to work up and down and register the amount of this play on the dial 9. This looseness or side play is indicated at 21.

Other measurements as indicated in Fig. 6 may be made with this type of apparatus. A shim piece 22 from the crank shaft bearing may be placed on a ball faced member 23 which in turn is placed on the iron or steel surface plate 19, to which the magnetic bracket 2 is attached. The contact 11 of the plunger of the gage is in contact with the upper side of the shim piece 22. In making this measurement the gage is set at zero when in contact with the rounded member 23; then when the shim piece 22 is inserted the thickness of the same will be indicated on the dial of the gage.

In Fig. 7 is indicated a method of measuring the amount that it is desired to take off of the bearing surfaces of the bearing cap for the crank shaft bearing. The bearing cap is indicated by 24 and it is placed again on the iron or steel surface plate 19, the magnetic bracket 2 being attached to a shelf on the surface plate 19 through magnetic attraction. It will be understood that what I am here measuring is the amount that is to be taken off of the under side 25 of the bearing cap, that is, the part that is in contact with the surface plate 19.

A certain measurement is indicated on the dial before any metal has been removed from the bearing cap. The cap is then filed or otherwise reduced and again placed under the dial. The difference between the two readings will indicate the amount removed. The bearing cap can be repeatedly reduced and measured until the proper amount has been removed to give a good bearing fit. Where shims are used they can be removed to the number indicated by the readings on the dial.

Figure 9:
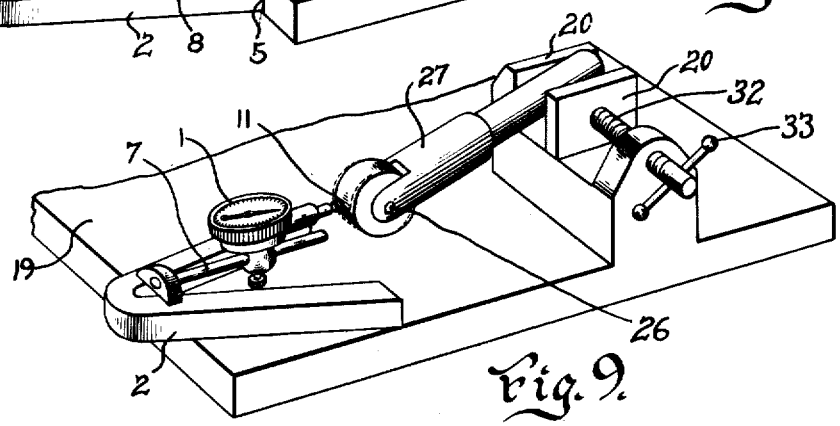
Fig. 9 is a perspective view showing a method of measuring the looseness in a roller type cam follower for operating the valves of a combustion motor.

In a similar manner the amount of looseness or play in the bearing 26 of a roller type cam follower 27 for operating the valves (see Fig. 9) may be determined by placing the magnetic bracket 2 on the surface plate 19 with the contact 11 engaging the edge of the roller, the roller being held by the clamps 20. The roller is moved back and forth by hand and the amount of play in the bearing 26 is indicated on the dial of the gage 1.

Figure 10:
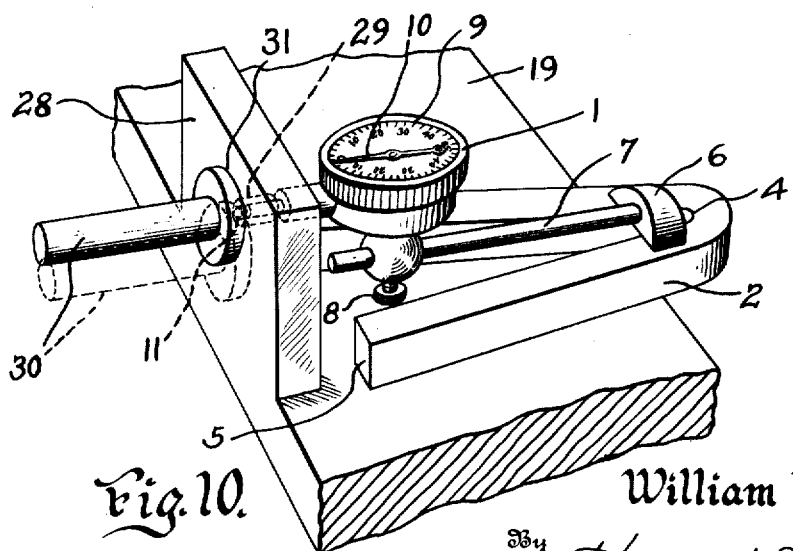
Fig. 10 is a perspective view showing a method of measuring the face area of a mushroom type cam follower for operating the valves of a motor.

The unevenness of the contact face of the mushroom type cam follower may be measured on the gage as indicated in Fig. 10. In this operation there is a vertical surface plate section 28 on the steel or iron surface plate 19 and an opening or hole 29 is made therein. Through this opening 29 is introduced the plunger of the gage 1, the gage being held in place on the surface plate 19 by the magnetic bracket 2, as in the operation shown in Fig. 9. The mushroom type cam follower 30 with its face 31 in contact with the face 28 of the surface plate 19 is moved over the section 28 of the surface plate coming in contact with the contact point 11 of the gage 1. The gage 1 will indicate the unevenness in the face of the cam follower 30.

From the foregoing description it will be seen that the surface plate 19 being made of iron or steel forms an important part in connection with the magnetic bracket 2 in making measurements for various kinds of devices that are to be measured, particularly of the play or looseness in the bearings thereof. This surface plate 19 is provided with the vise clamps 20 operated by the screw 32 and the handle 33 thereon and this surface plate 19 is provided with the vertical member 28 for measurement of the cam follower 30 as hereinabove described, thus forming a surface gage for the measurement of the face of the cam follower.

Of course, it will be understood that the magnetic gauge bracket can be magnetically supported only on magnetically susceptible materials, but it can be supported by hand or otherwise positively supported as well on materials that are not magnetically susceptible.

From the foregoing description of the apparatus and its various operations it will be seen that I have provided an extremely simple and efficient device for holding the measuring gage in related position to the parts that are to be measured and that I have provided simple and efficient means for operating the pistons or other members that are to be measured and means to measure the play in same, and that in conjunction with these measuring devices I have provided a surface plate member which through its magnetic attraction for the gage bracket provides simple and efficacious means for aligning the gage in desired positions, making accurate measurements of the parts under observation. It will further be seen that with this device practically all the play or looseness in the various parts of combustion engines may be definitely and accurately measured.

Having described my invention, I claim:

1. A distance gauge having, in combination, a support comprising a permanent magnet of the horse-shoe type having one face of the respective legs thereof in a common plane, whereby said support may be magnetically secured flatwise to a body, a distance indicator comprising a casing carrying a relatively movable contact feeler, and means including a rod-like member secured to said magnet for operatively securing said casing to said support.

2. A distance gauge having, in combination, a support comprising a permanent magnet of the horse-shoe type having the pole faces thereof in a common plane, whereby said support may be magnetically secured endwise to a body, a distance indicator comprising a casing carrying a relatively movable contact feeler, and means including a rod-like member secured to said magnet for operatively securing said casing to said support.

3. A distance gauge having, in combination, a support comprising a permanent magnet of the horse-shoe type having one face of the respective legs thereof in a common plane, said faces being of substantial area, and having pole faces of substantial area in a common plane, whereby said support may be magnetically secured to a body either endwise or flatwise, a distance indicator having a casing carrying a relatively movable contact feeler, and means including an elongated guide member secured to said magnet for operatively securing said casing to said support in adjustable relation thereto.

4. A distance gauge having, in combination, a support comprising a permanent magnet of the horse-shoe type the legs of which are formed to provide surfaces for magnetically securing said support flatwise to a body and the pole faces of which are formed for magnetically securing it endwise to a body, a distance indicator having a casing carrying a relatively movable contact feeler, and means including an elongated guide member secured to said magnet for operatively securing said casing to said support in adjustable relation thereto.

5. A distance gauge having, in combination, a support comprising a permanent magnet of the horse-shoe type formed with flat parallel faces and with pole faces of substantial area, whereby said support may be magnetically secured to a body either endwise or flatwise, a distance indicator having a casing carrying a relatively movable contact feeler, and means including an elongated guide member secured to said magnet for operatively securing said casing to said support in adjustable relation thereto.

6. A distance gauge having, in combination, a support comprising a rectangular bar bent and magnetized to form a permanent magnet of the horse-shoe type with the corresponding front and back faces of the two legs thereof in common planes, and with the pole faces thereof of substantial area, whereby said support may be magnetically secured to a body either endwise or flatwise, a distance indicator having a casing carrying a relatively movable contact feeler, and means for operatively securing said casing to said support.

7. A distance gauge having, in combination, a support comprising a permanent magnet having work contacting surfaces of substantial area at an angle to each other for magnetically securing said support to the work in a plurality of different positions, a gauge comprising a casing carrying a relatively movable contact feeler, and means for supporting said casing on said support in spaced relation thereto.

8. A distance gauge having, in combination, a support comprising a permanent magnet having work contacting surfaces of substantial area at an angle to each other for magnetically securing said support to the work in a plurality of different positions, a gauge comprising a casing carrying a relatively movable contact feeler, a projecting part fixedly secured to said support, and means for adjustably securing said casing to said part.

9. A distance gauge having, in combination, a supporting member comprising a permanent magnet of the horse-shoe type the pole faces of which are formed to present surfaces of substantial area in a plane normal to a plane bisecting the angle between the legs of said magnet, an elongated guide member lying in said last mentioned plane at one side of said magnet in parallel relation to the plane of the latter, said guide member at one end thereof being positively secured to said supporting member adjacent the apex thereof, a distance indicator having a casing slidably carried by said guide member, said distance indicator having a contact feeler projecting from said casing and carried thereby for reciprocation in said plane in which said guide member lies.

WILLIAM R. EDSON.

CERTIFICATE OF CORRECTION.

Patent No. 1,888,454.

November 22, 1932.

WILLIAM R. EDSON.

It is hereby certified that error appears in the printed specification of the above numbered patent requiring correction as follows: Page 3, line 130, claim 6, after "means" insert the words "including an elongated guide member secured to said magnet", and page 4, line 2, same claim, after "support" insert the words "in adjustable relation thereto"; and that the said Letters Patent should be read with these corrections therein that the same may conform to the record of the case in the Patent Office.

Signed and sealed this 17th day of January, A. D. 1933.

(Seal)

M. J. Moore,
Acting Commissioner of Patents.

for operatively securing said casing to said support.

7. A distance gauge having, in combination, a support comprising a permanent magnet having work contacting surfaces of substantial area at an angle to each other for magnetically securing said support to the work in a plurality of different positions, a gauge comprising a casing carrying a relatively movable contact feeler, and means for supporting said casing on said support in spaced relation thereto.

8. A distance gauge having, in combination, a support comprising a permanent magnet having work contacting surfaces of substantial area at an angle to each other for magnetically securing said support to the work in a plurality of different positions, a gauge comprising a casing carrying a relatively movable contact feeler, a projecting part fixedly secured to said support, and means for adjustably securing said casing to said part.

9. A distance gauge having, in combination, a supporting member comprising a permanent magnet of the horse-shoe type the pole faces of which are formed to present surfaces of substantial area in a plane normal to a plane bisecting the angle between the legs of said magnet, an elongated guide member lying in said last mentioned plane at one side of said magnet in parallel relation to the plane of the latter, said guide member at one end thereof being positively secured to said supporting member adjacent the apex thereof, a distance indicator having a casing slidably carried by said guide member, said distance indicator having a contact feeler projecting from said casing and carried thereby for reciprocation in said plane in which said guide member lies.

WILLIAM R. EDSON.

CERTIFICATE OF CORRECTION.

Patent No. 1,888,454.    November 22, 1932.

WILLIAM R. EDSON.

It is hereby certified that error appears in the printed specification of the above numbered patent requiring correction as follows: Page 3, line 130, claim 6, after "means" insert the words "including an elongated guide member secured to said magnet", and page 4, line 2, same claim, after "support" insert the words "in adjustable relation thereto"; and that the said Letters Patent should be read with these corrections therein that the same may conform to the record of the case in the Patent Office.

Signed and sealed this 17th day of January, A. D. 1933.

(Seal)

M. J. Moore,
Acting Commissioner of Patents.

CERTIFICATE OF CORRECTION.

Patent No. 1,888,454.                                                              November 22, 1932.

WILLIAM R. EDSON.

It is hereby certified that error appears in the printed specification of the above numbered patent requiring correction as follows: Page 3, line 130, claim 6, after "means" insert the words "including an elongated guide member secured to said magnet", and page 4, line 2, same claim, after "support" insert the words "in adjustable relation thereto"; and that the said Letters Patent should be read with these corrections therein that the same may conform to the record of the case in the Patent Office.

Signed and sealed this 17th day of January, A. D. 1933.

(Seal)                                                             M. J. Moore,
                                                                         Acting Commissioner of Patents.